United States Patent
Okajima et al.

(10) Patent No.: US 11,413,583 B2
(45) Date of Patent: Aug. 16, 2022

(54) FILTERING MEMBRANE CLEANING METHOD

(71) Applicant: Kubota Corporation, Osaka (JP)

(72) Inventors: Yasunobu Okajima, Amagasaki (JP); Yuki Kawashima, Amagasaki (JP); Yuji Otsuka, Amagasaki (JP); Yukako Morita, Amagasaki (JP); Ken Tanaka, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 141 days.

(21) Appl. No.: 16/888,488

(22) Filed: May 29, 2020

(65) Prior Publication Data
US 2020/0289988 A1 Sep. 17, 2020

Related U.S. Application Data

(63) Continuation of application No. PCT/JP2018/044336, filed on Dec. 3, 2018.

(30) Foreign Application Priority Data

Dec. 11, 2017 (JP) .............................. JP2017-236557

(51) Int. Cl.
*B01D 65/06* (2006.01)
*C02F 1/44* (2006.01)
*B01D 61/58* (2006.01)

(52) U.S. Cl.
CPC ................. *B01D 65/06* (2013.01); *C02F 1/44* (2013.01); *B01D 61/58* (2013.01);
(Continued)

(58) Field of Classification Search
CPC ..... B01D 65/06; B01D 2321/162; C02F 1/44; C02F 2209/03; C02F 2303/16
See application file for complete search history.

(56) References Cited

U.S. PATENT DOCUMENTS

2006/0091075 A1 5/2006 Cote et al.
2009/0177412 A1* 7/2009 Phattaranawik ..... B01D 61/025
702/50

FOREIGN PATENT DOCUMENTS

JP 09-29070 2/1997
JP 09029070 A * 2/1997
(Continued)

OTHER PUBLICATIONS

Machine Translation of JP2016172217, Yuji, 30 total pages, published 2016. (Year: 2016).*

(Continued)

*Primary Examiner* — Jonathan M Peo
(74) *Attorney, Agent, or Firm* — Beyer Law Group LLP

(57) ABSTRACT

Provided is a method for cleaning a filtration membrane provided in a membrane filtration device that is immersed in a liquid to be treated and performs solid-liquid separation on the liquid to be treated. When a transmembrane pressure difference exceeds a first predetermined pressure difference P1, a first cleaning step W1 for cleaning a filtration membrane is performed using a first chemical solution; when the transmembrane pressure difference immediately after performing the first cleaning step W1 exceeds a second predetermined pressure difference P2 that is lower than the first predetermined pressure difference, a second cleaning step W2 for cleaning the filtration membrane is performed using a second chemical solution having a concentration higher than the first chemical solution; and when the second cleaning step W2 is performed, the concentration of the second chemical solution and/or the cleaning time is changed according to the temperature of the liquid to be treated.

16 Claims, 12 Drawing Sheets

(52) U.S. Cl.
CPC .... *B01D 2321/162* (2013.01); *C02F 2209/03* (2013.01); *C02F 2303/16* (2013.01)

(56) References Cited

FOREIGN PATENT DOCUMENTS

| | | | | |
|---|---|---|---|---|
| JP | 2002-530188 | | | 9/2002 |
| JP | 2003-251156 | | | 9/2003 |
| JP | 2003251156 | A | * | 9/2003 |
| JP | 2004-230222 | | | 8/2004 |
| JP | 2006-82027 | | | 3/2006 |
| JP | 2006082027 | A | * | 3/2006 |
| JP | 2014-171922 | | | 9/2014 |
| JP | 2014171922 | A | * | 9/2014 |
| JP | 2014-237072 | | | 12/2014 |
| JP | 2016-172217 | | | 9/2016 |
| JP | 2016172217 | A | * | 9/2016 |
| JP | 2017-18859 | | | 1/2017 |
| JP | 2017-18940 | | | 1/2017 |

OTHER PUBLICATIONS

Machine Translation of JPH0929070A, Ishiyama, 15 total pages, published 1997. (Year: 1997).*
Machine Translation of JP2014171922, Iwanaga, 39 total pages, published 2014. (Year: 2014).*
International Search Report from International Application No. PCT/JP2018/044336 dated Jan. 22, 2019.

* cited by examiner

FILTERING MEMBRANE CLEANING METHOD

CLAIM OF PRIORITY

This application is a Continuation of International Patent Application No. PCT/JP2018/044336, filed on Dec. 3, 2018, which claims priority to Japanese Patent Application No. 2017-236557, filed on Dec. 11, 2017, each of which is hereby incorporated by reference.

BACKGROUND OF THE INVENTION

1. Field of the Invention

The present invention relates to a method for cleaning a filtration membrane provided in a membrane filtration device which is immersed in a liquid to be treated and performs solid-liquid separation of the liquid to be treated.

2. Description of the Related Art

Conventionally, a water treatment facility uses a membrane filtration device to perform solid-liquid separation for a liquid to be treated. The membrane filtration device is immersed in the liquid to be treated and has a filtration membrane. As a result of continuous filtration with the filtration membrane, suspended substances, suspended solids, and the like would adhere or deposit on a surface or inside of the membrane, making the filtration membrane clogged therewith. When such a clogging occurs, a difference between a pressure on the liquid-to-be-treated side (i.e., a primary side) and a pressure on the permeated water side (i.e., a secondary side) of the filtration membrane, that is, a transmembrane pressure difference, increases. As the transmembrane pressure difference rises, the permeation flux decreases, and thus it becomes difficult to obtain a stable treatment capacity for the liquid to be treated.

Therefore, when the transmembrane pressure difference rises to reach a predetermined value, the filtration membrane is cleaned with a chemical solution. A cleaning degree (or cleaning power) for a next cleaning is determined based on the transmembrane pressure difference measured immediately after restarting the filtration operation after cleaning the filtration membrane.

The concentration of the chemical solution and the cleaning time for the next cleaning are determined based on the cleaning degree. It should be noted that the greater the measured value of the transmembrane pressure, the greater the cleaning degree for the next cleaning, and the higher the cleaning degree, the higher the concentration of the chemical solution and the longer the cleaning time.

Thus, the cleaning degree is determined based on the measured value of the transmembrane pressure, and the filtration membrane is cleaned using a concentration of the chemical solution and a cleaning time corresponding to the determined cleaning degree. For example, see Japanese Patent Application Laid-Open No. 2017-18859 for such a method for cleaning the filtration membrane as described above.

BRIEF DESCRIPTION OF THE INVENTION

In the above-described conventional cleaning method, as the concentration of the chemical solution and the cleaning time are adjusted based on the value of the measured transmembrane pressure difference, the filtration membrane is cleaned using the concentration of the chemical solution and the cleaning time corresponding to the degree of clogging of the filtration membrane. Thus, by reducing an amount of the chemical solution used or shorten a length of the cleaning time, it may be possible to efficiently clean the filtration membrane to some extent.

However, such an adjustment for the cleaning degree (cleaning power) for the filtration membrane as described above is not only based on the value of the transmembrane pressure, but also greatly influenced by a temperature of the liquid to be treated in which the membrane filtration device is immersed. For example, when the temperature of the liquid to be treated is low, the cleaning speed is reduced. Therefore, even if the cleaning degree (the concentration of the chemical solution and cleaning time) is the same, cleaning of the filtration membrane may be insufficient, and thus the transmembrane pressure difference may not be sufficiently recovered. On the other hand, when the temperature of the liquid to be treated is high, the cleaning speed increases, and thus even if the cleaning degree is the same, the filtration membrane is cleaned excessively, which makes saving the power and cost for cleaning the filtration membrane difficult.

Thus, an object of the present invention is to provide a cost-effective and efficient method for cleaning a filtration membrane, which prevents insufficient or excessive cleaning depending on the temperature of the liquid to be treated.

A first aspect of the present invention provides a method for cleaning a filtration membrane provided in a membrane filtration device which is immersed in a liquid to be treated and performs solid-liquid separation of the liquid to be treated. The method includes performing a first cleaning step for cleaning the filtration membrane using a first chemical solution, if a transmembrane pressure difference exceeds a first predetermined pressure difference, and performing a second cleaning step for cleaning the filtration membrane using a second chemical solution having a concentration higher than that of the first chemical solution and/or for a cleaning time longer than that of the first cleaning step, if the transmembrane pressure difference immediately after the first cleaning step exceeds a second predetermined pressure difference which is lower than the first predetermined pressure difference. When the second cleaning step is performed, the concentration of the second chemical solution and/or the cleaning time of the second cleaning step is changed in accordance with a temperature of the liquid to be treated.

According to this, if the transmembrane pressure difference exceeds the first predetermined pressure difference when the membrane filtration is being performed, the membrane filtration is stopped and the first cleaning step is performed, whereby the filtration membrane is cleaned with a regular cleaning degree (cleaning power). This first cleaning process removes deposits and the like on the membrane surface, and the transmembrane pressure difference immediately after resuming the membrane filtration using the filtration membrane cleaned by the first cleaning step becomes lower than the transmembrane pressure difference immediately before the first cleaning step. However, after repeatedly performing such a membrane filtration and the first cleaning step, an amount of remaining deposits which are not completely removed from the filtration membrane gradually increases, which in turn gradually increases the transmembrane pressure difference at the time when the membrane filtration is resumed immediately after the first cleaning step. If the transmembrane pressure difference at the time when the membrane filtration is resumed immediately after the first cleaning step exceeds the second predetermined transmembrane pressure difference, the second cleaning step is performed. Thus, the filtration membrane is cleaned using the second chemical solution having a higher concentration than that of the first chemical solution, and/or for a longer cleaning time than that of the first cleaning step, whereby the filtration membrane is cleaned more strongly.

When the second cleaning step is performed, the concentration of the second chemical solution and/or the cleaning time of the second cleaning step are changed according to the temperature of the liquid to be treated, whereby the filtration membrane is cleaned with the chemical solution having an optimum concentration and/or for an optimum cleaning time according to the temperature of the liquid to be treated. Accordingly, it is possible to prevent an insufficient cleaning of the filtration membrane, an unnecessary increase in the consumption of the chemical solutions, or an unnecessarily long cleaning time, thereby saving the power and cost required for cleaning the filtration membrane such that a more cost-effective and efficient cleaning of the filtration membrane is realized.

A second aspect of the present invention provides the method for cleaning the filtration membrane which performs a third cleaning step for cleaning the filtration membrane using a third chemical solution different from the first and second chemical solutions, if a quotient obtained by dividing the transmembrane pressure difference immediately after performing the second cleaning step by the transmembrane pressure difference immediately after performing a previous second cleaning step which is performed one time before exceeds a predetermined ratio.

When other type of deposits which cannot be sufficiently removed with the first and second chemical solutions accumulate on the filtration membrane, a value obtained by dividing the transmembrane pressure difference immediately after the second cleaning step by the transmembrane pressure difference immediately after the previous second cleaning step exceeds the predetermined ratio. In such a case, by performing the third cleaning step of cleaning the filtration membrane using the third chemical solution suitable for removing such deposits of a different type, such a different type of deposits can so be sufficiently removed from the filtration membrane.

A third aspect of the present invention provides a method for cleaning a filtration membrane provided in a membrane filtration device which is immersed in a liquid to be treated and performs solid-liquid separation of the liquid to be treated. The method includes performing a first cleaning step for cleaning the filtration membrane using a first chemical solution, if a permeability of the filtration membrane is lower than a first predetermined permeability, and performing a second cleaning step for cleaning the filtration membrane using a second chemical solution having a concentration higher than that of the first chemical solution and/or for a cleaning time longer than that of the first cleaning step, if the permeability of the filtration membrane immediately after the first cleaning step is lower than a second permeability which is higher than the first predetermined permeability. When the second cleaning step is performed, the concentration of the second chemical solution and/or the cleaning time of the second cleaning step are changed in accordance with a temperature of the liquid to be treated.

According to this, when the permeability of the filtration membrane during the time when the membrane filtration is being performed becomes lower than the first permeability, the membrane filtration is stopped and the first cleaning step is performed, whereby the filtration membrane is cleaned with a regular cleaning power. This first cleaning process removes deposits and the like on the membrane surface, whereby the permeability at the time when the membrane filtration is resumed immediately after performing the first cleaning step is increased to be higher than the permeability immediately before performing the first cleaning step. However, when such a membrane filtration and the first cleaning step are repeatedly performed, an amount of remaining deposits which are not completely removed from the filtration membrane gradually increases thereon, thereby gradually decreasing the permeability when the membrane filtration is resumed immediately after performing the first cleaning step. If the permeability at the time of resuming the membrane filtration immediately after the first cleaning step falls below the second permeability, the second cleaning step is performed. Thus, the filtration membrane is cleaned using the second chemical solution having a higher concentration than that of the first chemical solution and/or for a longer cleaning time than that of the first cleaning step, whereby the filtration membrane is cleaned more strongly.

When the second cleaning step is performed, the concentration of the second chemical solution and/or the cleaning time of the second cleaning step are changed according to the temperature of the liquid to be treated, whereby the filtration membrane is cleaned using the chemical solution having an optimum concentration and/or for an optimum cleaning time according to the temperature of the liquid to be treated. Therefore, it is possible to prevent the cleaning of the filtration membrane from becoming insufficient, to prevent the consumption of the chemical solutions from unnecessarily increasing, or to prevent the cleaning time from becoming unnecessarily long, thereby saving the power and cost for cleaning the filtration membrane, thereby realizing a more cost-effective and efficient cleaning of the filtration membrane.

A fourth aspect of the present invention provides the method for cleaning the filtration membrane which further performs a third cleaning step for cleaning the filtration membrane using a third chemical solution different from the first and second chemical solutions, if a quotient obtained by dividing the permeability immediately after performing the second cleaning step by the permeability immediately after performing a most recent previous second cleaning step is lower than a predetermined ratio.

According to this, when other type of deposits which cannot be sufficiently removed using the first and second chemical solutions accumulate on the filtration membrane, a value obtained by dividing the permeability immediately after the second cleaning step by the permeability immediately after the previous second cleaning step performed most recently becomes smaller than the predetermined ratio. In such a case, such deposits of other type can also be sufficiently removed from the filtration membrane by performing the third cleaning step of cleaning the filtration membrane using the third chemical solution suitable for removing such other type of deposits.

A fifth aspect of the present invention provides the method for cleaning the filtration membrane, in which the second cleaning step is performed such that the higher the temperature of the liquid to be treated, the lower the concentration of the second chemical solution, and the lower the temperature of the liquid to be treated, the higher the concentration of the second chemical solution. Accordingly, in the second cleaning step, the filtration membrane is cleaned using the second chemical solution having an optimum concentration in accordance with the temperature of the liquid to be treated.

A sixth aspect of the present invention provides the method for cleaning the filtration membrane, in which the second cleaning step is performed such that the higher the temperature of the liquid to be treated, the shorter the cleaning time, and the lower the temperature of the liquid to be treated, the longer the cleaning time. Accordingly, in the second cleaning step, the filtration membrane is cleaned for an optimum cleaning time in accordance with the temperature of the liquid to be treated.

A seventh aspect of the present invention provides the method for cleaning the filtration membrane, in which the first chemical solution and the second chemical solution remove an organic substance adhered to the filtration membrane. Accordingly, the organic substance adhered to the filtration membrane can be sufficiently removed by performing the first cleaning step and the second cleaning step using the first chemical solution and the second chemical solution, respectively.

An eighth aspect of the present invention provides the method for cleaning the filtration membrane, in which the third cleaning step is performed such that the higher the temperature of the liquid to be treated, the lower a concentration of the third chemical solution, and the lower the temperature of the liquid to be treated, the higher the concentration of the third chemical solution. Accordingly, when the third cleaning step is performed, the filtration membrane is cleaned using the third chemical solution having an optimum concentration according to the temperature of the liquid to be treated.

A ninth aspect of the present invention provides the method for cleaning the filtration membrane, in which the third cleaning step is performed such that the higher the temperature of the liquid to be treated, the shorter the cleaning time, and the lower the temperature of the liquid to be treated, the longer the cleaning time. Accordingly, when the third cleaning step is performed, the filtration membrane is cleaned for an optimum cleaning time according to the temperature of the liquid to be treated.

A tenth aspect of the present invention provides the method for cleaning the filtration membrane, in which the third chemical solution removes an inorganic substance adhered to the filtration membrane. Accordingly, by performing the third cleaning step using the third chemical solution, it is possible to sufficiently remove the inorganic substance adhered to the filtration membrane.

As described above, according to the present invention, it is possible to prevent the cleaning of the filtration membrane from becoming insufficient or excessive depending on the temperature of the liquid to be treated, so as to realize a cost-effective and efficient cleaning of the filtration membrane.

DETAILED DESCRIPTION OF EMBODIMENTS OF THE INVENTION

Hereinafter, embodiments of the present invention will be described with reference to the drawings.

First Embodiment

Figure 1:
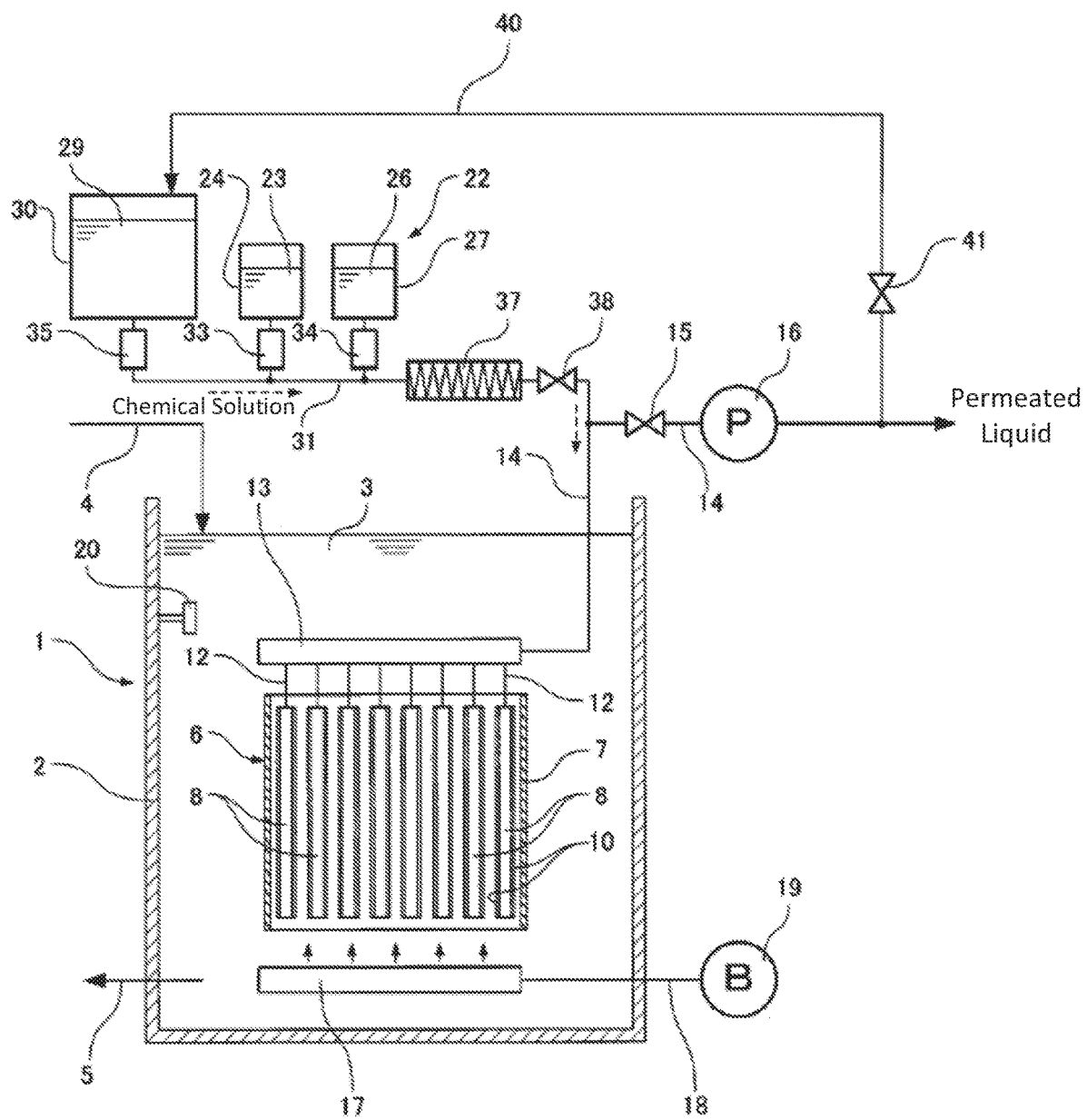
FIG. 1 is a diagram illustrating a membrane filtration device provided with a filtration membrane according to a first embodiment of the present invention.
Figure 2:
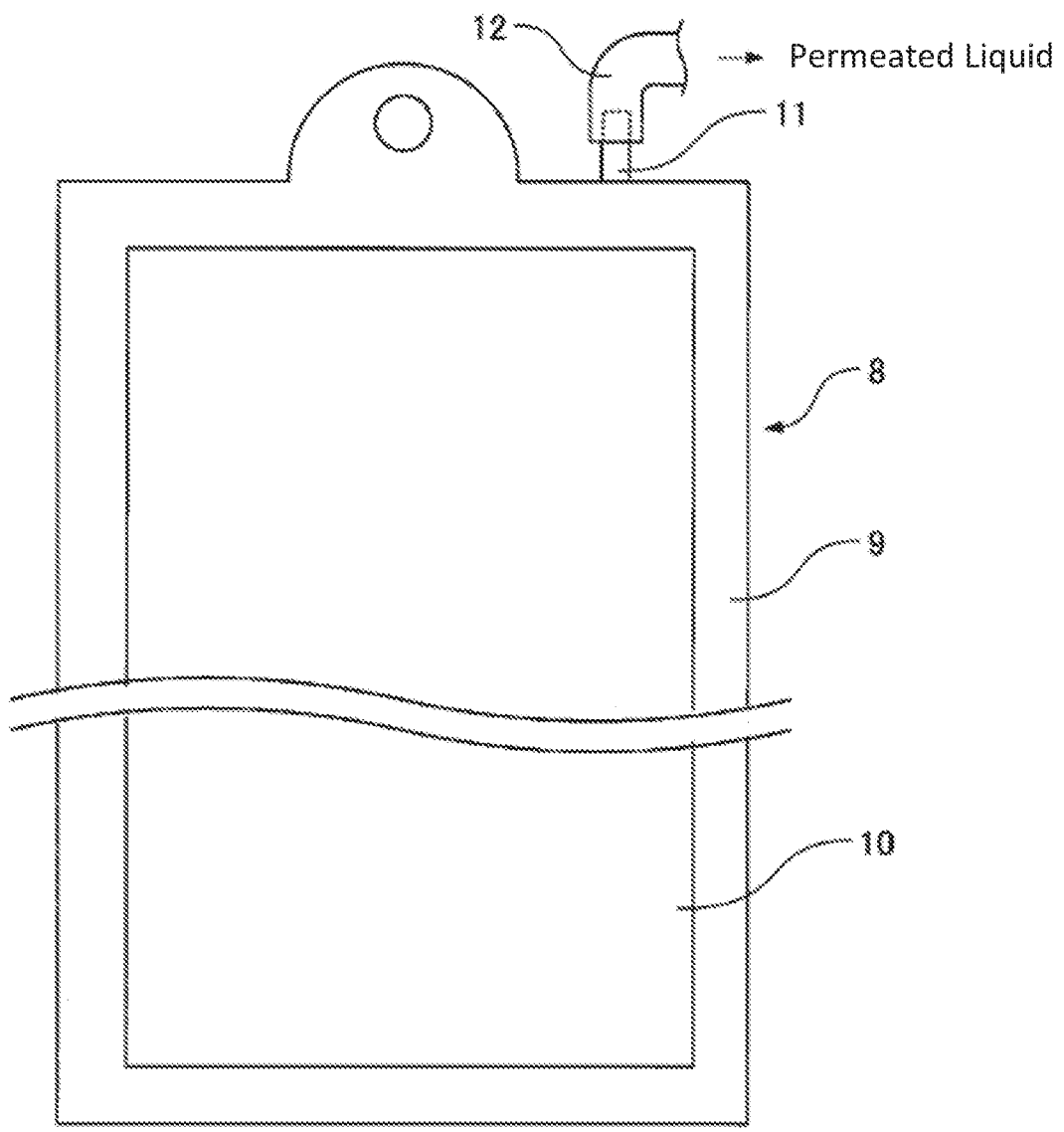
FIG. 2 is a diagram illustrating a flat membrane element provided in the membrane filtration device according to the first embodiment of the present invention.

In the first embodiment, as shown in FIG. 1, reference numeral 1 denotes an activated sludge treatment tank. A supply system 4 for supplying organic wastewater communicates with an upper part of a tank main body 2. A discharge system 5 for discharging excessive sludge communicates with a lower part of the tank main body 2. Liquid to be treated 3 is stored in the tank main body 2, and an immersion type membrane filtration device 6 and a temperature measuring device 20 for measuring the temperature of the liquid to be treated 3 are disposed therein. The liquid to be treated 3 is a mixture of organic wastewater and activated sludge. The organic wastewater is, for example, sewage, human waste, factory wastewater, and the like.

The membrane filtration device 6 has a box-shaped casing 7 with an open top and an open bottom, and a plurality of flat membrane elements 8 arranged in the casing 7. The flat membrane elements 8 are arranged parallel to one another along the vertical direction.

Each flat membrane element 8 has a filter plate 9 and a sheet-like filtration membrane 10 joined to both surfaces of the filter plate 9. A permeated liquid flow path is formed between the filter plate 9 and the filtration membrane 10, and inside the filter plate 9. A permeated liquid outlet 11 communicating with the permeated liquid flow path is provided at the upper end edge of the filter plate 9. The permeated liquid which has passed through the filtration membrane 10 is taken out of the permeated liquid outlet 11 through the permeated liquid flow path.

Each flat membrane element 8 communicates with a water collection pipe 13 via a tube 12 connected to the permeated liquid outlet 11. A permeated liquid discharge path 14 for extracting the permeated liquid is connected to the water collection pipe 13. The permeated liquid discharge path 14 is provided with a permeated liquid discharge valve 15 and a suction pump 16. An air diffuser 17 is provided below an array of the flat membrane elements 8. The air diffuser 17 is provided with a blower 19 via an air supply pipe 18.

The activated sludge treatment tank 1 is provided with a membrane cleaning device 22 for cleaning the filtration membrane 10 of each of the flat membrane elements 8. The membrane cleaning device 22 includes a first chemical solution storage tank 24 (an example of a first chemical solution storage unit) which stores a sodium hypochlorite solution 23 (an example of the first and second chemical solutions), a second chemical solution storage tank 27 (an example of a second chemical solution storage unit) which stores a citric acid solution 26 (an example of the third chemical solution), a diluent storage tank 30 (an example of a diluent storage unit) which stores a diluent 29, a chemical solution supply path 31 connected to the permeated liquid discharge path 14, a first chemical solution supply device 33 for supplying the sodium hypochlorite solution 23 stored in the first chemical solution storage tank 24 to the chemical solution supply path 31, a second chemical solution supply device 34 for supplying the citric acid solution 26 stored in the second chemical solution storage tank 27 to the chemical solution supply path 31, and a diluent liquid supply device 35 for supplying the diluent 29 stored in the diluent storage tank 30 to the chemical solution supply path 31, a static mixer 37 (an example of a chemical-liquid mixing device), and a chemical solution supply valve 38.

The chemical solution supply path 31 is connected between the water collecting pipe 13 and the permeated liquid discharge valve 15 provided on the permeated liquid discharge path 14.

The static mixer 37 and the chemical solution supply valve 38 are provided on the chemical solution supply path 31. The first and second chemical solution supply devices 33 and 34 and the diluent supply device 35 each include a valve, a supply pump, and the like. The static mixer 37 has a function of adjusting the concentration of the sodium hypochlorite solution 23 by mixing the sodium hypochlorite solution 23 and the diluent 29, and a function of adjusting the concentration of the citric acid solution 26 by mixing the citric acid solution 26 and the diluent 29.

The sodium hypochlorite solution 23 has an ability to remove deposits made of organic substances that have adhered to the filtration membrane 10. The citric acid solution 26 has an ability to remove deposits made of inorganic substances that have adhered to the filtration membrane 10.

In addition, a permeated liquid discharge path 40 is connected to the permeated liquid discharge path 14, which extracts part of the permeated liquid flowing through the permeated liquid discharge path 14 and supplies the extracted permeated liquid to the diluent storage tank 30. Thus, the part of the permeated liquid flowing through the permeated liquid discharge path 14 is supplied via the permeated liquid discharge path 40 to the diluent storage tank 30 and is used as the diluent 29. Also, a permeated liquid extraction valve 41 is provided on the permeated liquid extraction path 40.

A filtration operation F is performed by closing the chemical solution supply valve 38, opening the permeated liquid discharge valve 15, and operating the suction pump 16 and the blower 19. As a result, a large number of bubbles are released from the air diffuser 17 so as to rise between the flat membrane elements 8, whereby the liquid to be treated 3 is filtered by permeating through the filtration membrane 10 of each flat membrane element 8. The liquid to be treated 3 that has passed through the filtration membrane 10 flows as the permeated liquid into the water collecting pipe 13 through the tubes 12 of each flat membrane element 8, and is taken out of the water collecting pipe 13 through the permeated liquid discharge path 14, thereby flowing into an outside system. At this time, by opening the permeated liquid discharge valve 41, part of the permeated liquid flowing through the permeated liquid discharge path 14 is supplied to the diluent storage tank 30 through the permeated liquid discharge path 40, and stored in the diluents storage tank 30 as the diluent 29.

Figure 3:
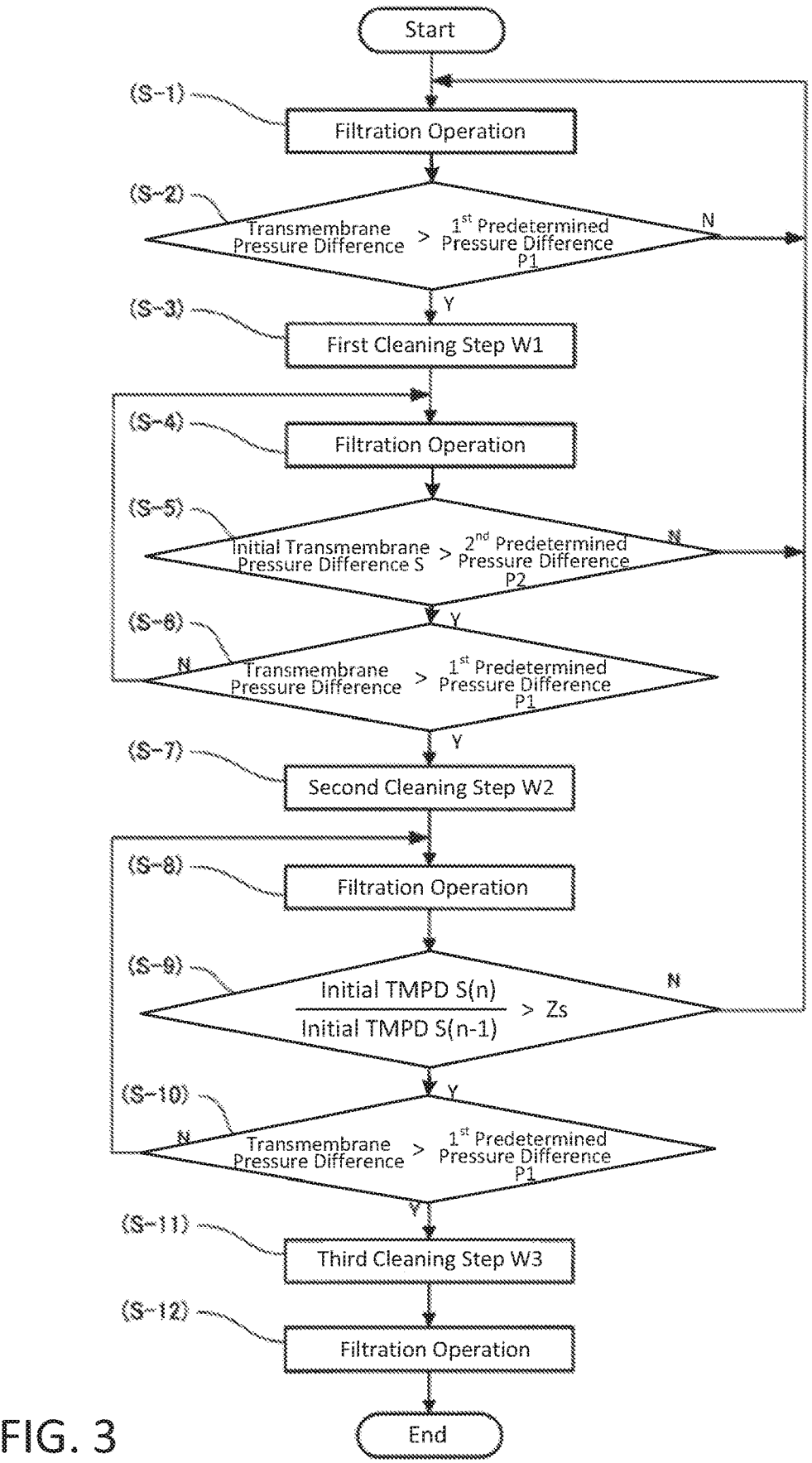
FIG. 3 is a flow diagram showing a method for cleaning a filtration membrane of the membrane filtration device according to the first embodiment of the present invention.

Hereinafter, a method for cleaning the filtration membrane 10 will be described with reference to the flowchart shown in FIG. 3.

Figure 4:
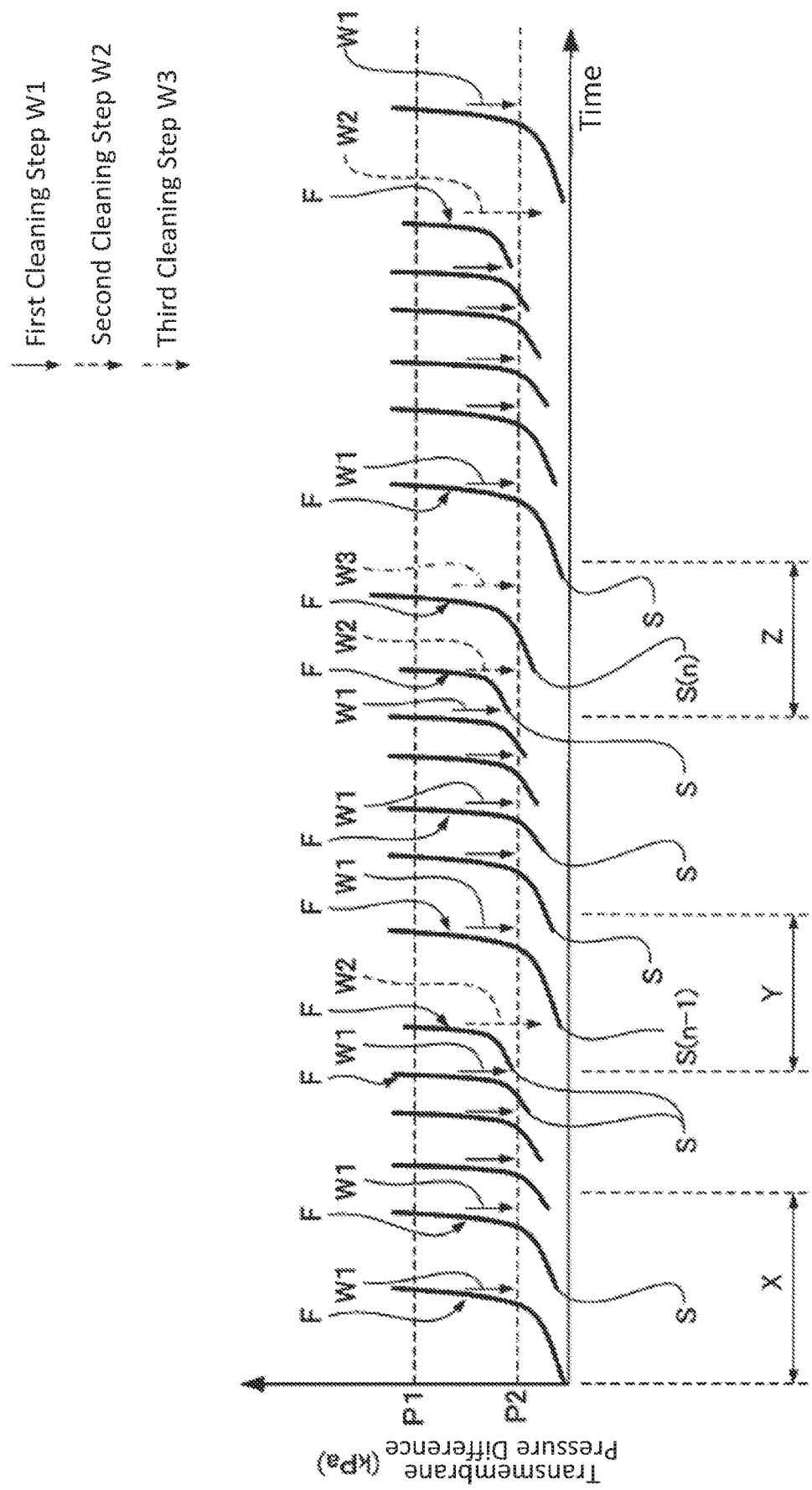
FIG. 4 is a diagram showing the relationship between the time and the transmembrane pressure difference when the membrane filtration device performs the filtration operation and the cleaning of the filtration membrane according to the first embodiment of the present invention.
Figure 5:
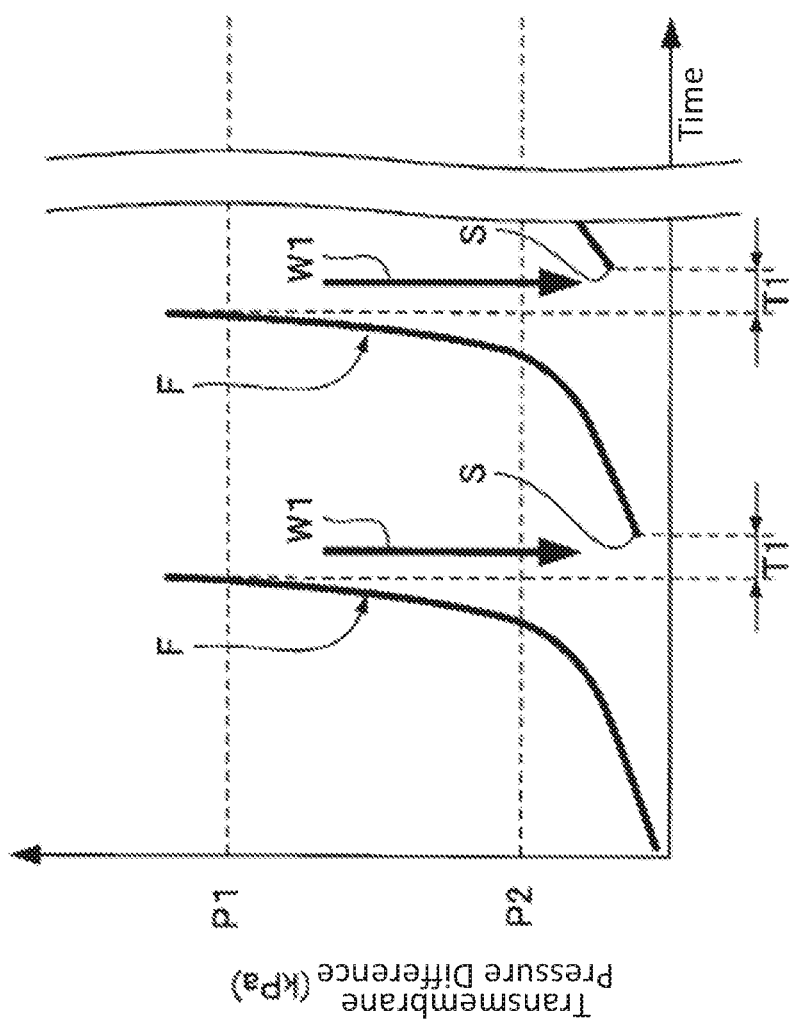
FIG. 5 is an enlarged view of portion X of the diagram in FIG. 4.

As the filtration operation F as described above continues (S-1), suspended substances, suspended solids, and the like adhere to a surface or inside of the filtration membrane 10, which causes the filtration membrane 10 to clog and thus the transmembrane pressure gradually increases as shown in diagrams of FIGS. 4 and 5. When the transmembrane pressure exceeds a first predetermined pressure difference P1 (S-2), the filtration operation F is temporarily stopped, and a first cleaning step W1 is performed (S-3), in which the filtration membrane 10 is cleaned using the sodium hypochlorite solution 23 with a regular cleaning degree A. As shown in Table 1 below, at the regular cleaning degree A, the filtration membrane 10 is cleaned using the sodium hypochlorite solution 23 (an example of the first chemical solution) having a predetermined regular concentration C0 (for example, a concentration of about several percent by weight) for a first cleaning time T1.

TABLE 1

| First Cleaning Step W1 | | |
|---|---|---|
| Cleaning degree | Concentration of Sodium Hypochlorite Solution [Weight %] | Cleaning Time |
| A | C0 | T1 |

As the filtration operation F as described above continues (S-1), suspended substances, suspended solids, and the like adhere to a surface or inside of the filtration membrane 10, which causes the filtration membrane 10 to clog and thus the transmembrane pressure gradually increases as shown in diagrams of FIGS. 4 and 5. When the transmembrane pressure exceeds a first predetermined pressure difference P1 (S-2), the filtration operation F is temporarily stopped, and a first cleaning step W1 is performed (S-3), in which the filtration membrane 10 is cleaned using the sodium hypochlorite solution 23 with a regular cleaning degree A. As shown in Table 1 below, at the regular cleaning degree A, the filtration membrane 10 is cleaned using the sodium hypochlorite solution 23 (an example of the first chemical solution) having a predetermined regular concentration C0 (for example, a concentration of about several percent by weight) for a first cleaning time T1.

The first cleaning step W1 is performed, as shown in FIG. 1, by stopping the suction pump 16 and the blower 19, closing the permeated liquid discharge valve 15, opening the chemical solution supply valve 38, and operating the first chemical solution supply device 33 and the diluent supply device 35. As a result, a predetermined amount of the sodium hypochlorite solution 23 is supplied from the first chemical solution storage tank 24 to the static mixer 37 through the chemical solution supply path 31, while a predetermined amount of the diluent 29 is supplied to the static mixer 37 from the diluent storage tank 30 through the chemical solution supply path 31, whereby the sodium hypochlorite solution 23 is mixed with the diluent 29 and adjusted to have a predetermined concentration C0 in the static mixer 37. Thus, the sodium hypochlorite solution 23 having the predetermined concentration C0 is supplied from the chemical solution supply path 31 through the permeated liquid discharge path 14, the water collecting pipe 13, and the tube 12 to the inside of each flat membrane element 8 so as to in contact with the filtration membrane 10. The filtration membrane 10 is thus cleaned with the sodium hypochlorite solution 23, whereby the deposits on the filtration membrane 10 are removed.

As shown in the diagrams of FIGS. 4 and 5, after the first cleaning step W1 is performed for the first cleaning time T1, the first cleaning step W1 is stopped and the filtration operation F is resumed (S-4). The transmembrane pressure immediately after the filtration operation F is resumed is lower than that immediately before performing the first cleaning step W1, since the deposits have been removed from the filtration membrane 10.

Then, as the filtration operation F continues, the filtration membrane 10 gradually becomes clogged, whereby the transmembrane pressure increases, and when the transmembrane pressure exceeds the first predetermined pressure difference P1, the first cleaning step W1 is performed again.

As the filtration operation F and the first cleaning step W1 are alternately repeated, the amount of the deposits which have not been completely removed from the filtration membrane 10 and thus remaining thereon gradually increases, whereby the transmembrane pressure S upon resuming the filtration operation F immediately after the first cleaning step W1 gradually increases. In the following description, the transmembrane pressure S upon resuming the filtration operation F immediately after performing the first cleaning step W1 is referred to as an initial transmembrane pressure S.

Figure 6:
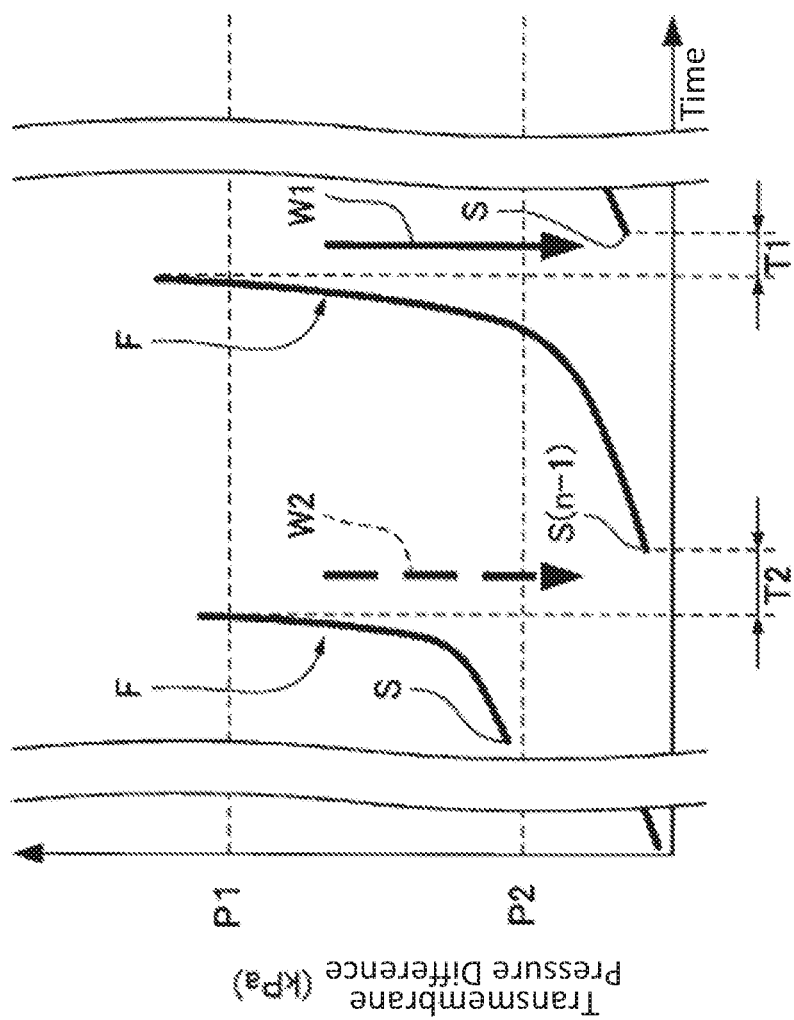
FIG. 6 is n enlarged view of portion Y of the diagram in FIG. 4.

As shown in the diagrams of FIGS. 4 and 6, in case where the initial transmembrane pressure S exceeds a second predetermined pressure difference P2 (S-5), if the subsequent transmembrane pressure difference exceeds the first predetermined pressure difference P1 (S-6), the filtration operation F is halted, and a second cleaning step W2 is performed (S-7), in which the filtration membrane 10 is cleaned with the sodium hypochlorite solution 23 at cleaning degrees B1 to B5 higher than the regular cleaning degree A. The second predetermined pressure difference P2 is set lower than the first predetermined pressure difference P1. Further, the cleaning time in the second cleaning step W2 is set to a second cleaning time T2 longer than the first cleaning time T1.

As shown in Table 2 below, the cleaning degrees B1 to B5 in the second cleaning step W2 are set in five stages (a plurality of stages) according to the temperature of the liquid to be treated 3 measured by the temperature measuring device 20. For example, when the temperature of the liquid to be treated 3 is lower than D1 [° C.], the first cleaning degree B1 is selected, and the concentration of the sodium hypochlorite solution 23 is set to a predetermined high concentration C1.

When the temperature of the liquid to be treated 3 is equal to or higher than D1 [° C.] and lower than D2 [° C.], the second cleaning degree B2 is selected, and the concentration of the sodium hypochlorite solution 23 is set to a predetermined high concentration C2.

When the temperature of the liquid to be treated 3 is equal to or higher than D2 [° C.] and lower than D3 [° C.], the third cleaning degree B3 is selected, and the concentration of the sodium hypochlorite solution 23 is set to a predetermined high concentration C3.

When the temperature of the liquid to be treated 3 is equal to or higher than D3 [° C.] and lower than D4 [° C.], the fourth cleaning degree B4 is selected, and the concentration of the sodium hypochlorite solution 23 is set to a predetermined high concentration C4.

When the temperature of the liquid to be treated 3 is equal to or higher than D4 [° C.], the fifth cleaning degree B5 is selected, and the concentration of the sodium hypochlorite solution 23 is set to a predetermined high concentration C5.

The predetermined high concentrations C1 to C5 of the sodium hypochlorite solution 23 (an example of the second chemical solution) in the first to fifth cleaning degrees B1 to B5 in the second cleaning step W2 are set in a range (for example, a concentration of about several ten percent by weight) higher than the predetermined concentration C0 of the sodium hypochlorite solution 23 (an example of the first chemical solution) in the first cleaning step W1, and satisfy the following relationships: "Concentration C1>Concentration C2>Concentration C3>Concentration C4>Concentration C5>Concentration C0". In addition, the temperatures of the liquid to be treated 3 have the following relationships: "Temperature D1<Temperature D2<Temperature D3<Temperature D4". As such, in the second cleaning step W2, the higher the temperatures D1 to D4 of the liquid to be treated 3, the lower the concentrations C1 to C5 of the sodium hypochlorite solution 23, and the lower the temperatures D1 to D4 of the liquid to be treated 3, the higher the concentration C1 to C5 of the sodium hypochlorite solution 23.

TABLE 2

| | Second Clearing Step W2 | | |
|---|---|---|---|
| Degree of Cleaning | Temperature of Liquid to be Treated [° C.] | Concentration of Sodium Hypochlorite Solution [Wt %] | Cleaning Time |
| B1 | Lower than D1 | C1 | T3 |
| B2 | Equal to or Higher than D1 and Lower than D2 | C2 | T2 |
| B3 | Equal to or Higher than D2 and Lower than D3 | C3 | T2 |
| B4 | Equal to or Higher than D3 and Lower than D4 | C4 | T2 |
| B5 | Equal to or Higher than D4 | C5 | T2 |

When the second cleaning step W2 is performed, if the temperature of the liquid to be treated 3 measured by the temperature measuring device 20 is, for example, equal to or higher than D1 [° C.] and lower than D2 [° C.], the second cleaning degree B2 is selected and the concentration of the sodium hypochlorite solution 23 is set to a predetermined high concentration C2.

Thus, in the static mixer 37, the sodium hypochlorite solution 23 is mixed with the diluent 29 and adjusted to have the predetermined high concentration C2, whereby the sodium hypochlorite solution 23 having the predetermined high concentration C2 is supplied into each flat membrane element 8 so as to come into contact with the filtration membrane 10. As a result, the filtration membrane 10 is powerfully cleaned by the sodium hypochlorite solution 23 having the concentration C2 higher than the predetermined concentration C0 of the first cleaning step W1, whereby the deposits on the filtration membrane 10 are powerfully removed.

Alternatively, if the temperature of the liquid to be treated 3 measured by the temperature measuring device 20 is, for example, equal to or higher than D3 [° C.] and lower than D4 [° C.], the fourth cleaning degree B4 is selected and the concentration of the sodium hypochlorite solution 23 is set to a predetermined high concentration C4, and the filtration membrane 10 is strongly cleaned by the sodium hypochlorite solution 23 having the concentration C4 higher than the predetermined concentration C0 of the first cleaning step W1.

As described above, by changing the cleaning degrees B1 to B5 in the second cleaning step W2 according to the temperature of the liquid to be treated 3 measured by the temperature measuring device 20, the filtration membrane 10 is cleaned for the second cleaning time T2 using the sodium hypochlorite solution 23 having the concentration corresponding to the optimum cleaning degree based on the temperature of the liquid to be treated 3. Accordingly, it is possible to prevent insufficient cleaning of the filtration membrane 10, excessive use of the sodium hypochlorite solution 23, and unnecessarily long cleaning time. Thus, the power and cost required for cleaning the filtration membrane 10 can be reduced, and the filtration membrane 10 can be efficiently cleaned with less waste.

After performing the second cleaning step W2 for the second cleaning time T2, the second cleaning step W2 is stopped and the filtration operation F is resumed (S-8). The transmembrane pressure difference immediately after resuming the filtration operation F is lower than that immediately before performing the second cleaning step W2, since the deposits have been removed from the filtration membrane 10. Thereafter, if the transmembrane pressure difference does not satisfy a condition in a determination step (S-9) described below, steps (S-1) to (S-8) are performed in the same manner as described above.

The above-described first cleaning step W1 and second cleaning step W2 using the sodium hypochlorite solution 23 can sufficiently remove deposits mainly composed of organic substances from the filtration membrane 10. However, by continuing the filtration operation F, a small amount of inorganic substances contained in the liquid to be treated 3 may adhere to the filtration membrane 10, and such inorganic deposits may gradually grow on the surface of the filtration membrane 10, which makes it difficult to sufficiently remove such inorganic deposits using the sodium hypochlorite solution 23.

Figure 7:
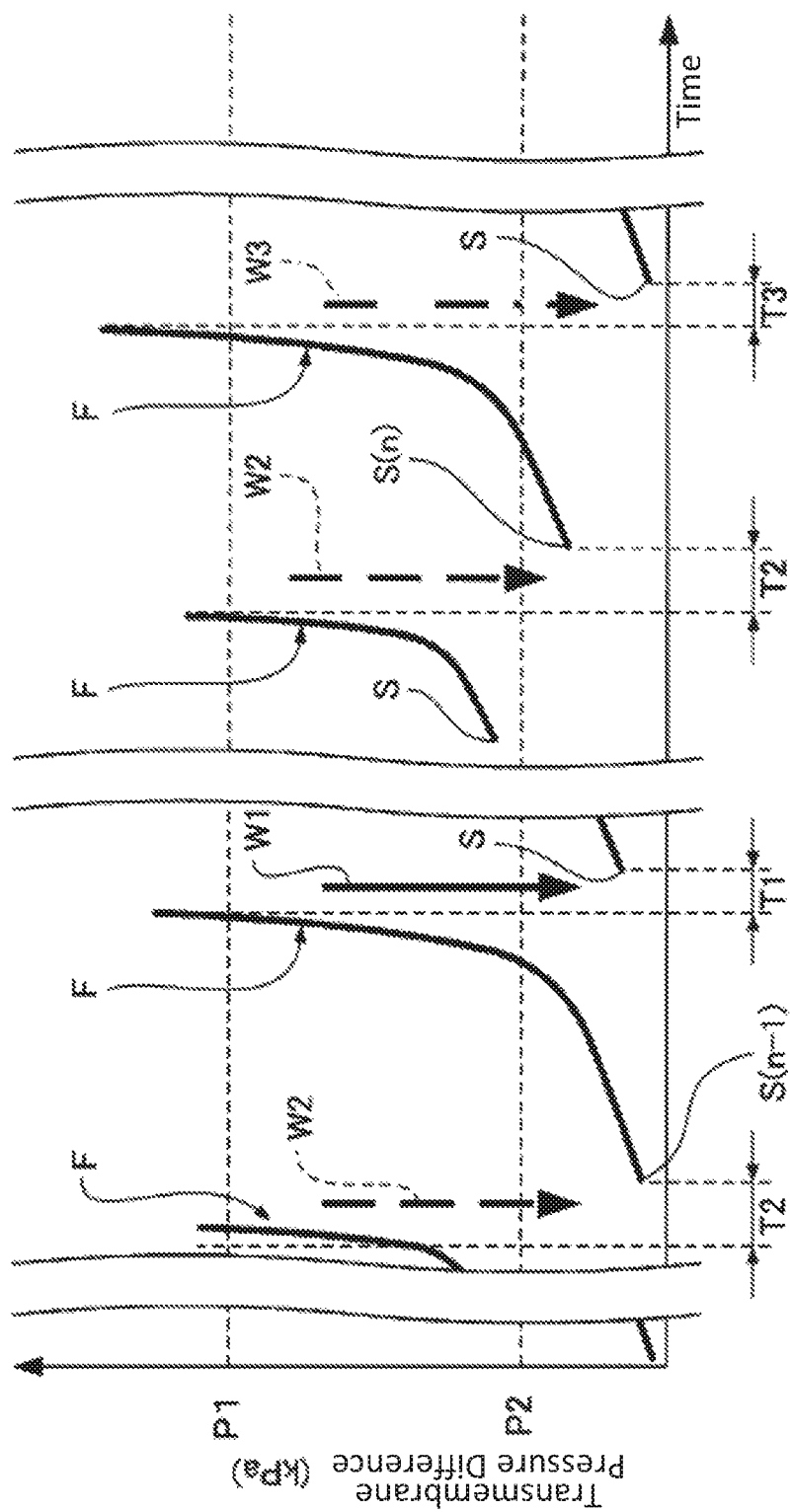
FIG. 7 is an enlarged view of portion Y and portion Z of the diagram in FIG. 4.

When the amount of the inorganic substances attached to the filtration membrane 10 increases, as shown in the diagrams of FIGS. 4 and 7, the ratio of the initial transmembrane pressure $S(n)$ immediately after the second cleaning step W2 with respect to the previous initial transmembrane pressure difference $S(n-1)$ immediately after the previous second cleaning step W2 performed one time therebefore becomes large. In case where the ratio between the initial transmembrane pressure $S(n)$ and the previous initial transmembrane pressure $S(n-1)$ exceeds a predetermined ratio Zs (S-9), and if the subsequent transmembrane pressure exceeds the first pressure difference P1 (S-10), the filtration operation F is temporarily stopped, and a third cleaning step W3 is performed (S-11), in which the filtration membrane 10 is cleaned using the citric acid solution 26.

That is, the predetermined ratio Zs is a constant greater than 1, and when the value of "Initial Transmembrane Pressure $S(n)$/Previous Initial Transmembrane Pressure $S(n-1)$" exceeds the predetermined ratio Zs, and if a subsequent transmembrane pressure exceeds the first predetermined pressure difference P1, then the filtration operation F is temporarily stopped, and the third cleaning step W3 is performed as described below. The cleaning time in the third cleaning step W3 is set as a third cleaning time T3, and the third cleaning time T3 is the same as the first cleaning time T1 in this embodiment.

In the third cleaning step W3, a predetermined amount of the citric acid solution 26 flows from the second chemical solution storage tank 27 to the static mixer 37 through the chemical solution supply path 31 by operating the second chemical solution supply device 34 and the diluent supply device 35, while a predetermined amount of the diluent 29 is supplied from the diluent storage tank 30 to the static mixer 37 through the chemical solution supply path 31. The citric acid solution 26 is mixed with the diluents 29 in the static mixer 37 and adjusted to have a predetermined concentration, and then the citric acid solution 26 having the predetermined concentration is supplied into the flat membrane element 8 so as to come into contact with the filtration membrane 10. As a result, the filtration membrane 10 is cleaned with the citric acid solution 26, whereby the inorganic deposits are sufficiently removed from the filtration membrane 10.

After the third cleaning step W3 is performed for the third cleaning time T3, the third cleaning step W3 is stopped and the filtration operation F is resumed (S-12). The transmembrane pressure difference immediately after resuming the filtration operation F is lower than that immediately before performing the third cleaning step W3, since the deposits have been removed from the filtration membrane 10. Thereafter, similarly, steps S-1 to S-12 in the flow diagram shown in FIG. 3 are repeatedly performed: when the transmembrane pressure difference exceeds the first predetermined pressure difference P1, the first cleaning step W1 is performed, and when the initial transmembrane pressure S exceeds the second predetermined pressure difference P2, and if the subsequent transmembrane pressure exceeds the first predetermined pressure difference P1, then the filtration operation F is halted, and the second cleaning step W2 is performed.

Furthermore, in the case where the ratio of the initial transmembrane pressure $S(n)$ immediately after the second cleaning step W2 with respect to the previous initial transmembrane pressure $S(n-1)$ immediately after the previous second cleaning step W2 performed one time therebefore exceeds the predetermined ratio Zs, if the subsequent transmembrane pressure exceeds the first predetermined pressure difference P1, the filtration operation F may be temporarily stopped and the third cleaning step W3 may be performed.

As described above, by performing the second cleaning step W2 using the sodium hypochlorite solution 23, the organic deposits attached to the filtration membrane 10 can be sufficiently removed, and by performing the third cleaning step W3 using the citric acid solution 26, the inorganic deposits attached to the filtration membrane 10 can be sufficiently removed, and thus both of the organic and inorganic deposits can be efficiently removed.

Second Embodiment

In the method for cleaning the filtration membrane 10 according to the first embodiment described above, the transmembrane pressure difference of the filtration membrane 10 is used as an index for performing the first cleaning step W1, the second cleaning step W2, and the third cleaning step W3. On the other hand, in the second embodiment described below, the permeability of the filtration membrane 10, instead of the transmembrane pressure difference thereof, is used an index for performing the first cleaning step W1, the second cleaning step W1, and the third cleaning step W3.

The permeability is a value obtained by dividing the permeation flux [m/day] passing through the filtration membrane 10 by the transmembrane pressure difference [kPa] of the filtration membrane 10. That is, "Permeability=Permeation Flux/Transmembrane Pressure Difference".

Figure 8:
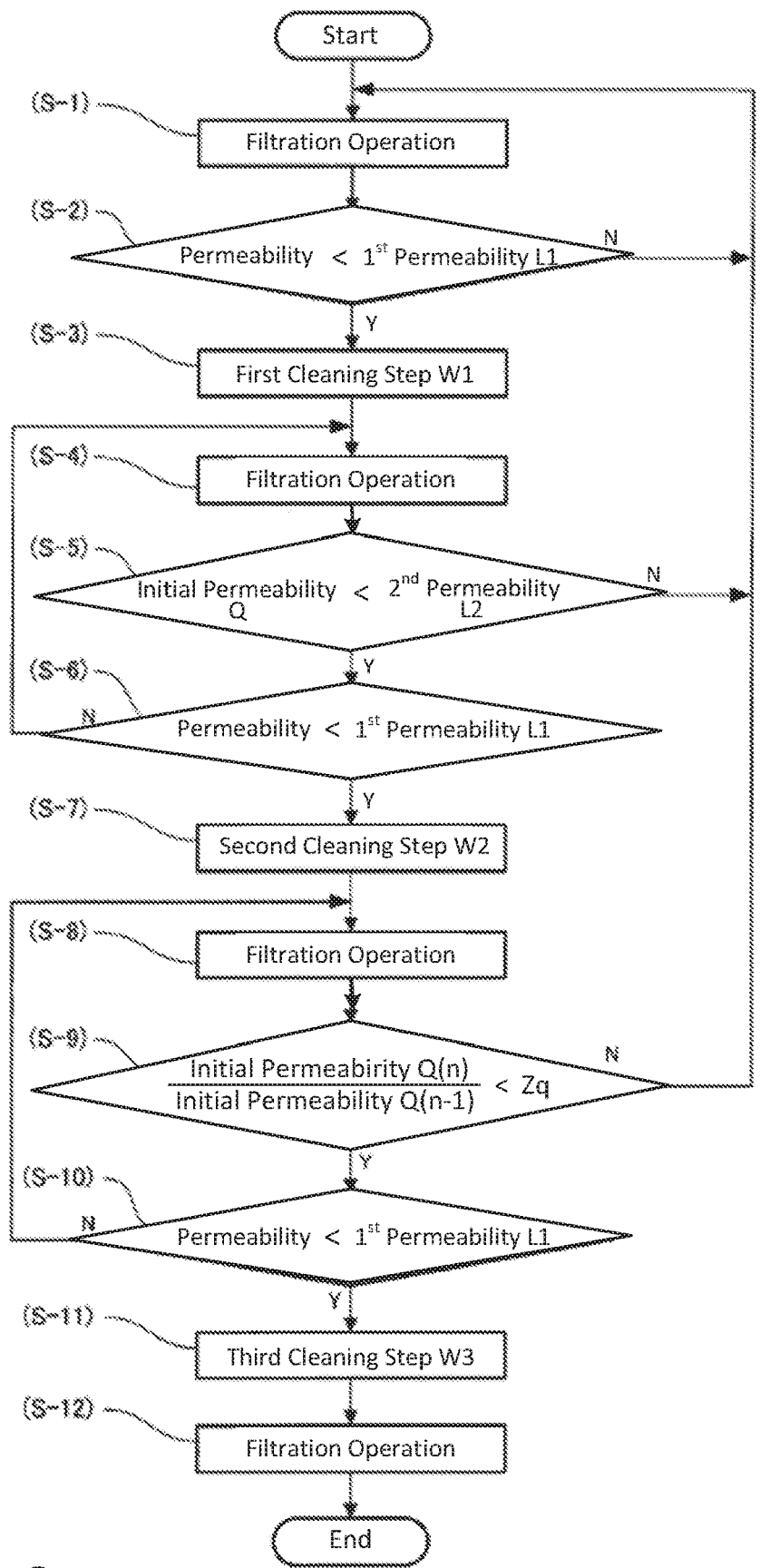
FIG. 8 is a flowchart illustrating a method for cleaning a filtration membrane according to a second embodiment of the present invention.

Hereinafter, a method for cleaning the filtration membrane 10 will be described with reference to the flow diagram shown in FIG. 8.

Figure 9:
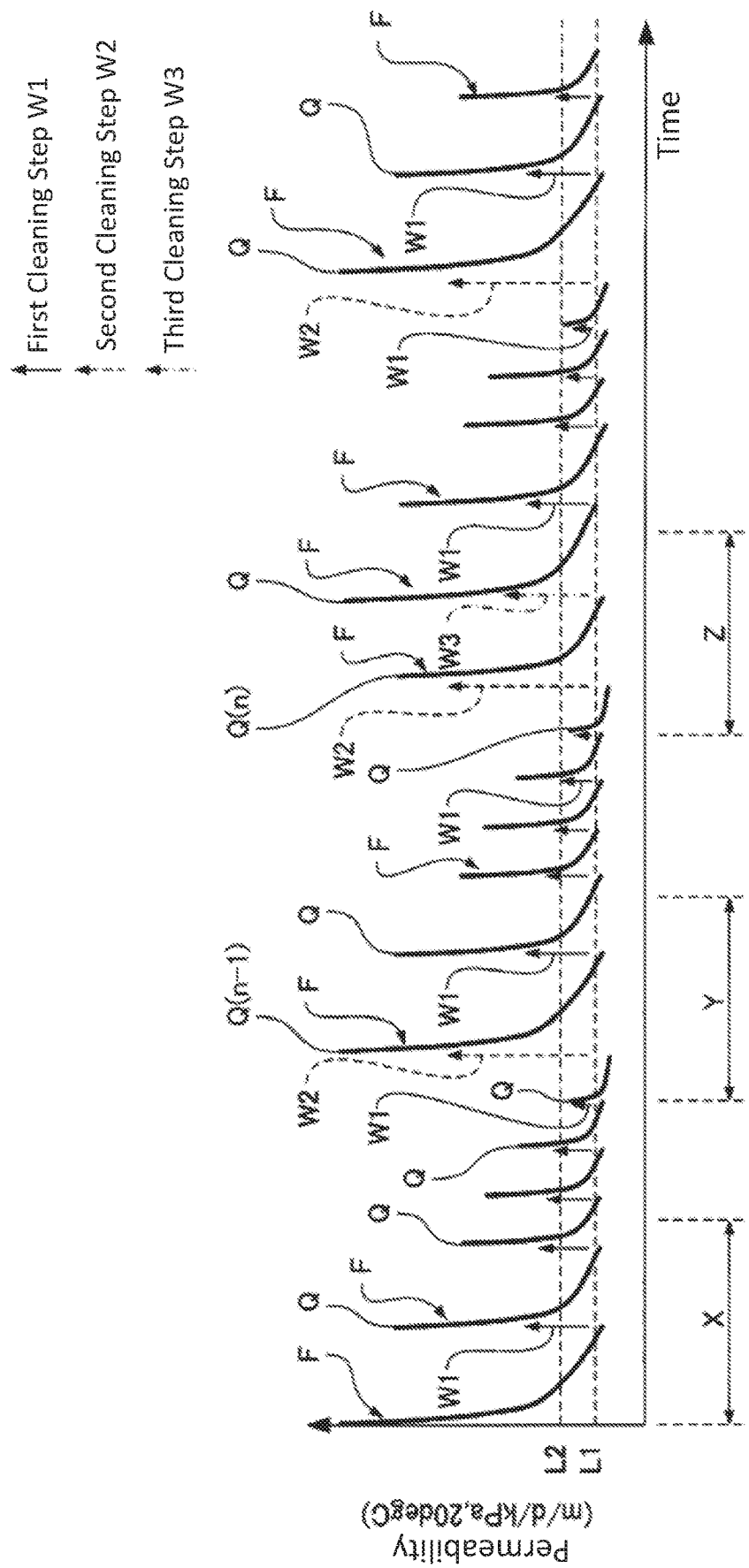
FIG. 9 is a diagram showing the relationship between the time and the permeability when the membrane filtration device performs the filtration operation and the cleaning of the filtration membrane according to the second embodiment of the present invention.
Figure 10:
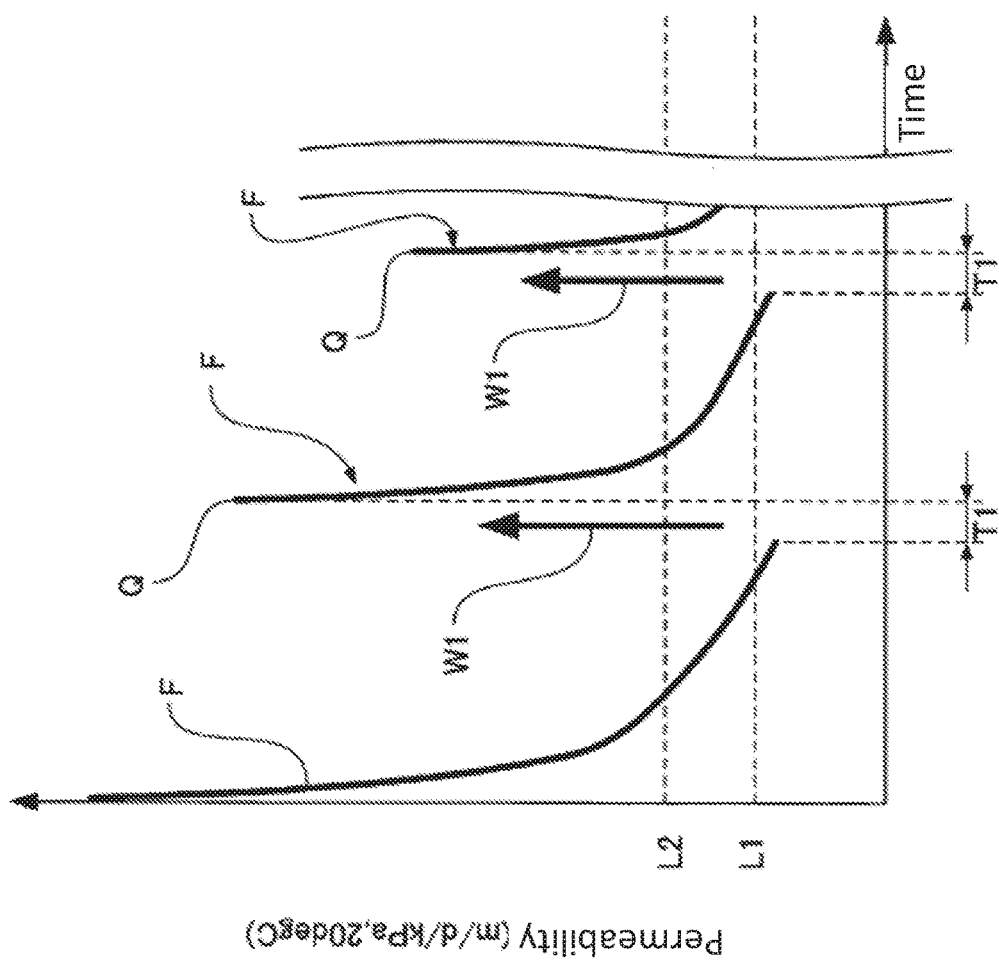
FIG. 10 is an enlarged view of portion X of the diagram in FIG. 9.

By continuing the filtration operation F (S-1), suspended substances, suspended solids, and the like adhere on the surface and inside of the filtration membrane 10 so as to cause the filtration membrane 10 to clog, whereby the permeability [m/day/kPa] of the filtration membrane 10 gradually decreases as shown in the diagrams of FIGS. 9 and 10. When the permeability falls below the first permeability L1 (S-2), the filtration operation F is temporarily stopped, and the first cleaning step W1 is performed (S-3) in which the filtration membrane 10 is cleaned using the sodium hypochlorite solution 23 with a regular cleaning degree A. With the regular cleaning degree A, the filtration membrane 10 is cleaned using the sodium hypochlorite solution 23 having a predetermined regular concentration C0 for the first cleaning time T1. As a result, the filtration membrane 10 is cleaned with the sodium hypochlorite solution 23, whereby the deposits on the filtration membrane 10 are removed.

After the first cleaning step W1 is performed for the first cleaning time T1, the first cleaning step W1 is stopped, and the filtration operation F is resumed (S-4). The permeability of the filtration membrane 10 immediately after restarting the filtration operation F is higher than that immediately before performing the first cleaning step W1, since the deposits have been removed from the filtration membrane 10.

Then, by continuing the filtration operation F, the filtration membrane 10 gradually becomes clogged, thereby decreasing the permeability. When the permeability does not satisfy a condition in step (S-5) as described below, steps (S-1) to (S-4) are performed in a similar manner as that described above, and then if the permeability falls below a first permeability L1, the first cleaning step W1 is performed again.

As the filtration operation F and the first cleaning step W1 are alternately repeated, an amount of the deposits which have not been completely removed from the filtration membrane 10 and thus remaining thereon gradually increases, whereby the permeability Q upon resuming the filtration operation F immediately after performing the first cleaning step W1 gradually decreases. In the following description, the permeability Q upon resuming the filtration operation F immediately after performing the first cleaning step W1 as described above, is referred to as the initial permeability Q.

Figure 11:
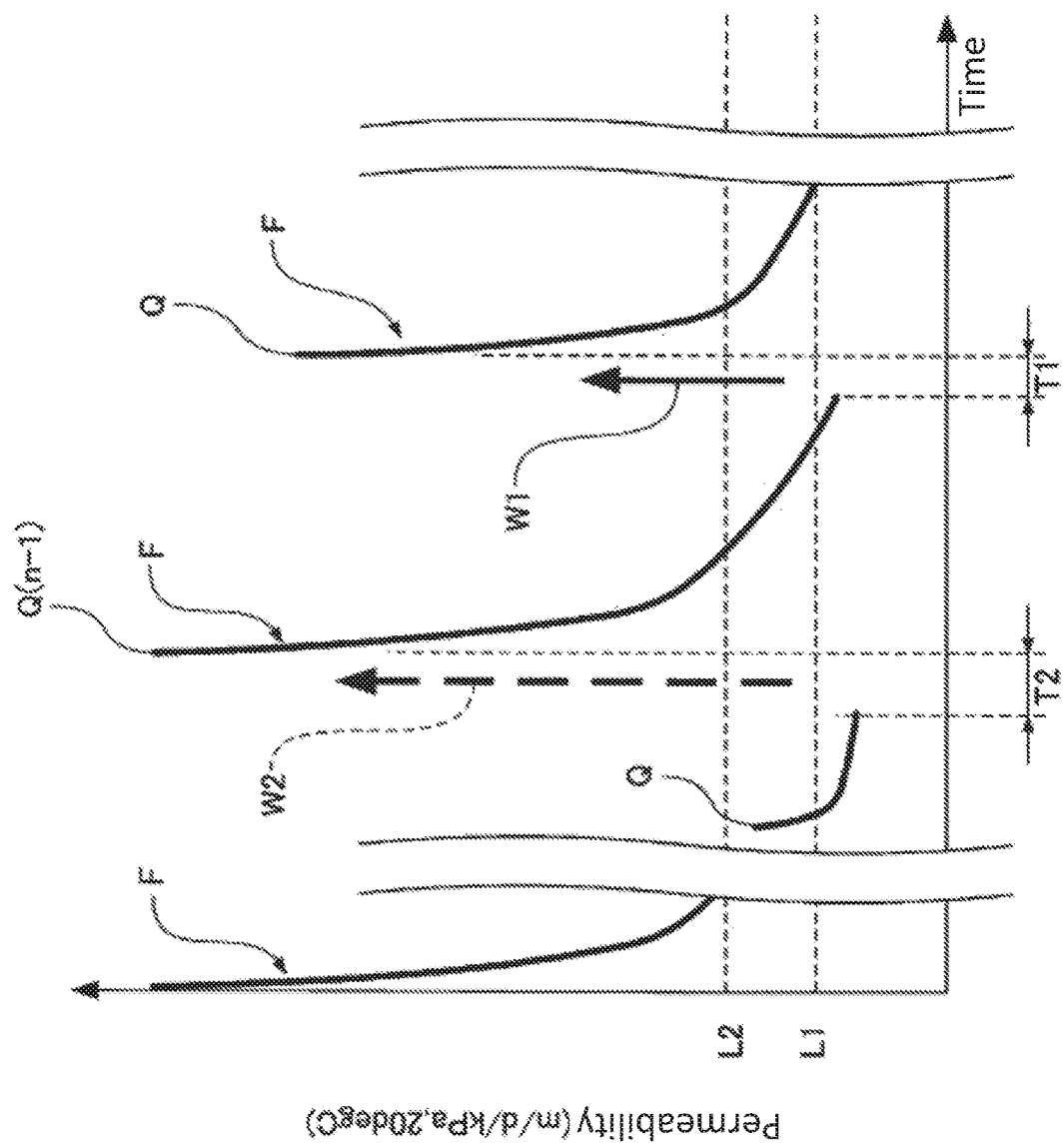
FIG. 11 is an enlarged view of portion Y of the diagram in FIG. 9.

As shown in the diagrams of FIGS. 9 and 11, in case where the initial permeability Q is lower than a second permeability L2 (S-5), if the subsequent permeability falls below the first permeability L1 (S-6), the filtration operation F is temporally stopped, and the second cleaning step W2 is performed (S-7), in which the filtration membrane 10 is cleaned with the sodium hypochlorite solution 23 at cleaning degrees B1 to B5 higher than the regular cleaning degree A. The second permeability L2 is set higher than the first permeability L1. Further, the cleaning time in the second cleaning step W2 is set to a second cleaning time T2 longer than the first cleaning time T1.

As shown in Table 2 above, the cleaning degrees B1 to B5 in the second cleaning step W2 are set in five stages (a plurality of stages) according to the temperature of the liquid to be treated 3 measured by the temperature measuring device 20.

When the second cleaning step W2 is performed, if the temperature of the liquid to be treated 3 measured by the temperature measuring device 20 is, for example, equal to or higher than D2 [° C.] and lower than D3 [° C.], the third cleaning degree B3 is selected, and the concentration of the sodium hypochlorite solution 23 is set to a predetermined high concentration C3.

Thus, in the static mixer 37, the sodium hypochlorite solution 23 is mixed with the diluent 29 and adjusted to have the predetermined high concentration C3, whereby the sodium hypochlorite solution 23 having the predetermined high concentration C3 is supplied into each flat membrane element 8 so as to come into contact with the filtration membrane 10. As a result, the filtration membrane 10 is powerfully cleaned by the sodium hypochlorite solution 23 having the concentration C3 higher than the predetermined concentration C0 of the first cleaning step W1, whereby the deposits on the filtration membrane 10 are powerfully removed.

As described above, by changing the cleaning degrees B1 to B5 in the second cleaning step W2 according to the temperature of the liquid to be treated 3 measured by the temperature measuring device 20, the filtration membrane 10 is cleaned for the second cleaning time T2 using the sodium hypochlorite solution 23 having the concentration corresponding to the optimum cleaning degree based on the temperature of the liquid to be treated 3. Accordingly, it is possible to prevent insufficient cleaning of the filtration membrane 10, excessive use of the sodium hypochlorite solution 23, and unnecessarily long cleaning time. Thus, the power and cost required for cleaning the filtration membrane 10 can be reduced, and the filtration membrane 10 can be efficiently cleaned with less waste.

After performing the second cleaning step W2 for the second cleaning time T2, the second cleaning step W2 is stopped and the filtration operation F is resumed (S-8). The permeability immediately after resuming the filtration operation F is higher than that immediately before performing the second cleaning step W2, since the deposits have been removed from the filtration membrane 10. Thereafter, if the permeability does not satisfy a condition in a determination step (S-9) described below, steps (S-1) to (S-8) are performed in the same manner as described above.

Figure 12:
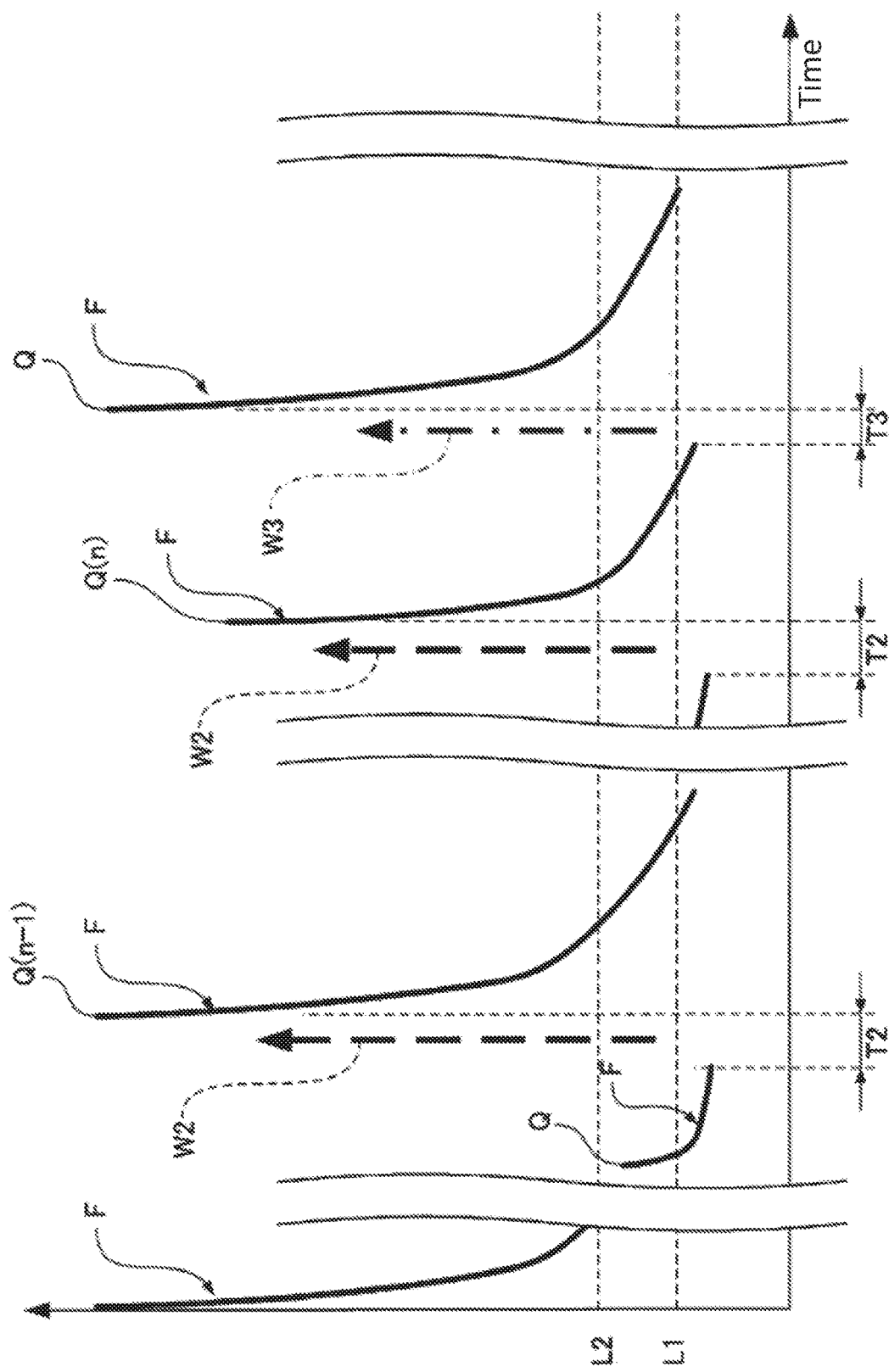
FIG. 12 is an enlarged view of portion Y and portion Z of the diagram in FIG. 9.

By continuing the filtration operation F, as a small amount of inorganic substances contained in the liquid to be treated 3 may adhere to the filtration membrane 10 and grow thereon, as shown in the diagrams of FIGS. 9 and 12, the ratio of the initial permeability Q(n) immediately after the second cleaning step W2 with respect to the previous initial permeability Q(n−1) immediately after the previous second cleaning step W2 performed one time therebefore becomes small. In case where the ratio between the initial permeability Q (n) and the previous initial permeability Q (n−1) is lower than a predetermined ratio Zq (S-9), and if a subsequent permeability falls below the first permeability L1 (S-10), the filtration operation F is temporarily stopped, and a third cleaning step W3 is performed (S-11), in which the filtration membrane 10 is cleaned using the citric acid solution 26.

That is, the predetermined ratio Zq is a constant smaller than 1, and when the value of "Initial Permeability Q(n)/Previous Initial Permeability Q(n−1)" falls below the predetermined ratio Zq, and if the subsequent permeability falls below the first permeability L1, the filtration operation F is temporarily stopped, and the third cleaning step W3 is performed as described below. The cleaning time in the third cleaning step W3 is set as a third cleaning time T3, and the third cleaning time T3 is the same as the first cleaning time T1.

In the third cleaning step W3, a citric acid solution 26 having a predetermined concentration is supplied into the flat membrane element 8 so as to come into contact with the filtration membrane 10. As a result, the filtration membrane 10 is cleaned with the citric acid solution 26, whereby the inorganic deposits are sufficiently removed from the filtration membrane 10.

After the third cleaning step W3 is performed for the third cleaning time T3, the third cleaning step W3 is stopped and the filtration operation F is resumed (S-12). The permeability immediately after resuming the filtration operation F is higher than that immediately before performing the third cleaning step W3, since the deposits have been removed from the filtration membrane 10. Thereafter, similarly, steps S-1 to S-12 in the flow diagram shown in FIG. 8 are repeatedly performed, and when the permeability becomes lower than the first permeability L1, the first cleaning step W1 is performed, and when the initial permeability Q falls below the second predetermined permeability L2, and if a subsequent permeability falls below the first predetermined permeability L1, then the filtration operation F is halted, and the second cleaning step W2 is performed.

Furthermore, in the case where the ratio of the initial permeability Q(n) immediately after the second cleaning step W2 with respect to the previous initial permeability Q(n−1) immediately after the previous second cleaning step W2 performed one time therebefore becomes lower than the predetermined ratio Zq, if a subsequent permeability falls below the first predetermined permeability L1, the filtration operation F may be temporarily stopped and the third cleaning step W3 may be performed.

As described above, by performing the second cleaning step W2 using the sodium hypochlorite solution 23, the organic deposits attached to the filtration membrane 10 can be sufficiently removed, and by performing the third cleaning step W3 using the citric acid solution 26, the inorganic deposits attached to the filtration membrane 10 can be sufficiently removed, and thus both of the organic and inorganic deposits can be efficiently removed.

In the first and second embodiments described above, the second cleaning time T2 is set longer than the first cleaning time T1, and the third cleaning time T3 is set to be the same as the first cleaning time T1. However, the present invention is not limited to these settings. For example, the first cleaning time T1, the second cleaning time T2, and the third cleaning time T3 may be set different from one another, or all may be set to be the same.

In the first and second embodiments, the concentration of the sodium hypochlorite solution 23 is determined based on the cleaning degrees A and B1 to B5. In addition, the concentrations C1 to C5 of the sodium hypochlorite solution 23 for the cleaning degrees B1 to B5 in the second cleaning step W2 are set higher than the concentrations C0 of the sodium hypochlorite solution 23 for the cleaning degree A in the first cleaning step W1. By changing the cleaning degrees B1 to B5 in the second cleaning step W2, the concentrations C1 to C5 of the sodium hypochlorite solution 23 in the second cleaning step W2 are changed. However, the present invention is not limited to these embodiments.

Third Embodiment

For example, as a third embodiment, as shown in Table 3 below, the cleaning times T1 and $T2_1$ to $T2_5$ may be determined based on the respective cleaning degrees A and $B1_1$ to $B5_1$, and the second cleaning times $T2_1$ to $T2_5$ corresponding to the cleaning degrees $B1_1$ to $B5_1$ in the second cleaning step W2 may be set longer than the first cleaning time T1 corresponding to the cleaning degree A in the first cleaning step W1, and by changing the cleaning degrees $B1_1$ to $B5_1$ of the second cleaning step W2, the second cleaning times $T2_1$ to $T2_5$ may be changed.

TABLE 3

| | Second Cleaning Step W2 | | |
| --- | --- | --- | --- |
| Cleaning Degree | Temperature of Liquid to be Treated [° C.] | Concentration of Sodium Hypochlorite Solution [Wt %] | Cleaning Time |
| $B1_1$ | Lower than D1 | C6 | $T2_1$ |
| $B2_1$ | Equal to or Higher than D1 and lower than D2 | C6 | $T2_2$ |
| $B3_1$ | Equal to or Higher than D2 and lower than D3 | C6 | $T2_3$ |
| $B4_1$ | Equal to or Higher than D3 and lower than D4 | C6 | $T2_4$ |
| $B5_1$ | Equal to or Higher than D4 | C6 | $T2_5$ |

In this case, when the second cleaning step W2 is performed, the higher the temperature of the liquid to be treated 3, the shorter the second cleaning time $T2_1$ to $T2_5$, and the lower the temperature of the liquid to be treated 3, the longer the second cleaning time $T2_1$ to $T2_5$. More specifically, in Table 3 above, the concentration C6 of the sodium hypochlorite solution 23 in the first to fifth cleaning degrees $B1_1$ to $B5_1$ in the second cleaning step W2 is set to be the same concentration, and among the second cleaning times $T2_1$ to $T2_5$ for the cleaning degrees $B1_1$ to $B5_1$, the cleaning time $T2_1$ for the first cleaning degree $B1_1$ is the longest, and the cleaning time $T2_5$ for the fifth cleaning degree $B5_1$ is the shortest. That is, the relationships among them are set as: "Cleaning Time $T2_1$ for First Cleaning Degree $B1_1$>Cleaning Time $T2_2$ for Second Cleaning Degree $B2_1$>Cleaning Time $T2_3$ for Third Cleaning Degree $B3_1$>Cleaning Time $T2_4$ for Fourth Cleaning Degree $B4_1$>Cleaning Time $T2_5$ for Fifth Cleaning Degree $B5_1$."

The concentration C6 of the sodium hypochlorite solution 23 for the first to fifth cleaning degrees $B1_1$ to $B5_1$ in the second cleaning step W2 is set higher than the concentration C0 of the sodium hypochlorite solution 23 for the regular cleaning degree A in the first cleaning step W1. Thus, when the second cleaning step W2 is performed, the filtration membrane 10 is cleaned in the optimum second cleaning time T2 according to the temperature of the liquid to be treated 3.

Fourth Embodiment

In the fourth embodiment, as shown in Table 4 below, the concentration of the sodium hypochlorite solution 23 and the cleaning times T1 and $T2_1$ to $T2_5$ are determined based on the cleaning degrees A and $B1_2$ to $B5_2$. The concentrations C1 to C5 of the sodium hypochlorite solution 23 for the cleaning degrees $B1_2$ to $B5_2$ in the second cleaning step W2 are set higher than the concentrations C0 of the sodium hypochlorite solution 23 for the cleaning degree A in the first cleaning step W1, while the second cleaning times $T2_1$ to $T2_5$ for the cleaning degrees $B1_2$ to $B5_2$ in the second cleaning step W2 are set longer than the first cleaning time T1 in the cleaning degree A of the first cleaning step W1.

By changing the cleaning degrees $B1_2$ to $B5_2$ in the second cleaning step W2, both of the respective concentrations C1 to C5 of the sodium hypochlorite solution 23 and the respective second cleaning times $T2_1$ to $T2_5$ may be changed.

TABLE 4

Second Cleaning Step W2

| Cleaning Degree | Temperature of Liquid to be Treated [° C.] | Concentration of Sodium Hypochlorite Solution [Wt %] | Cleaning Time |
|---|---|---|---|
| $B1_2$ | Lower than D1 | C1 | $T2_1$ |
| $B2_2$ | Equal to or Higher than D1 and lower than D2 | C2 | $T2_2$ |
| $B3_2$ | Equal to or Higher than D2 and lower than D3 | C3 | $T2_3$ |
| $B4_2$ | Equal to or Higher than D3 and lower than D4 | C4 | $T2_4$ |
| $B5_2$ | Equal to or Higher than D4 | C5 | $T2_5$ |

In this case, when performing the second cleaning step W2, the higher the temperature of the liquid to be treated 3, the lower the concentrations C1 to C5 of the sodium hypochlorite solution 23 and the shorter the second cleaning times $T2_1$ to $T2_5$, while the lower the temperature of the liquid to be treated 3, the higher the concentrations C1 to C5 of the sodium hypochlorite solution 23 and the longer the second cleaning times $T2_1$ to $T2_5$.

Specifically, in Table 4 above, the respective concentrations C1 to C5 of the sodium hypochlorite solution 23 for the first to fifth cleaning degrees $B1_2$ to $B5_2$ in the second cleaning step W2 have the following relationships among them: "Concentration C1>Concentration C2>Concentration C3>Concentration C4>Concentration C5>Concentration C0". Further, among the second cleaning times T2 for the cleaning degrees $B1_2$ to $B5_2$, the cleaning time $T2_1$ for the first cleaning degree $B1_2$ is the longest, and the cleaning time $T2_5$ for the fifth cleaning degree $B5_2$ is the shortest. That is, the relationships among them are set as follows: "Cleaning Time $T2_1$ for First Cleaning Degree $B1_2$>Cleaning Time $T2_2$ for Second Cleaning Degree $B2_2$>Cleaning Time $T2_3$ for Third Cleaning Degree $B3_2$>Cleaning Time $T2_4$ for Fourth Cleaning Degree $B4_2$>Cleaning Time $T2_5$ for Fifth Cleaning Degree $B5_2$".

Thus, when the second cleaning step W2 is performed, the filtration membrane 10 is cleaned with the optimum concentration of the sodium hypochlorite solution 23 and the optimum second cleaning time T2 according to the temperature of the liquid to be treated 3.

Fifth Embodiment

In the first and second embodiments, the filtration membrane 10 is cleaned in the third cleaning step W3 using the citric acid solution 26 having the predetermined concentration. However, in the third cleaning step W3 in accordance with the fifth embodiment, the higher the temperature of the liquid to be treated 3, the lower the concentration of the citric acid solution 26 may be, and the lower the temperature of the liquid to be treated 3, the higher the concentration of the citric acid solution 26 may be.

In addition, in the third cleaning step W3, the third cleaning time T3 may be set to a fixed time regardless of the temperature of the liquid to be treated 3. Alternatively, the higher the temperature of the liquid to be treated 3, the shorter the third cleaning time T3 may be, and the lower the temperature of the liquid to be treated 3, the longer the third cleaning time T3 may be.

According to this, when the third cleaning step W3 is performed, the filtration membrane 10 is cleaned with the optimum concentration of the citric acid solution 26 according to the temperature of the liquid to be treated 3.

Sixth Embodiment

In the first and second embodiments, the third cleaning time T3 in the third cleaning step W3 is set to be a fixed time regardless of the temperature of the liquid to be treated 3. However, In the third cleaning step W3 in accordance with the sixth embodiment, the higher the temperature of the liquid to be treated 3, the shorter the third cleaning time T3 may be, and the lower the temperature of the liquid to be treated 3, the longer the third cleaning time T3 may be.

In the third cleaning step W3, the filtration membrane 10 may be cleaned with the citric acid solution 26 having a predetermined concentration. Alternatively, the higher the temperature of the liquid to be treated 3, the lower the concentration of the citric acid solution 26 may be, and the lower the temperature of the liquid to be treated 3, the higher the concentration of the citric acid solution 26 may be.

According to this, when third cleaning step W3 is performed, the filtration membrane 10 is cleaned for the optimum third cleaning time T3 according to the temperature of the liquid to be treated 3.

In the above-described embodiments, the citric acid solution 26 is used as an example of the third chemical solution. However, a hydrochloric acid solution or an oxalic acid solution may also be used.

In each of the above embodiments, as shown in Table 2, five levels of cleaning degrees B1 to B5 are set for the second cleaning step W2. However, the present invention is not limited to the five levels, but other number of the levels may be set.

What is claimed is:
1. A method for cleaning a filtration membrane which is provided in a membrane filtration device immersed in a liquid to be treated and performs solid-liquid separation of the liquid to be treated, the method comprising:
monitoring a transmembrane pressure difference of the filtration membrane while performing a filtration operation by the membrane filtration device;
performing, repeatedly, a first cleaning step for cleaning the filtration membrane using a first chemical solution, if a current transmembrane pressure difference exceeds a first predetermined pressure difference, followed by returning to the filtration operation;
performing, repeatedly, a second cleaning step for cleaning the filtration membrane using a second chemical solution having a concentration higher than that of the first chemical solution and/or for a cleaning time longer than that of the first cleaning step, instead of performing the first cleaning step, if an initial transmembrane pressure difference measured immediately after the first cleaning step most recently performed exceeds a second predetermined pressure difference which is lower than the first predetermined pressure difference, and if the current transmembrane pressure difference exceeds the first predetermined pressure difference, followed by returning to the filtration operation;

performing a determining step including:
obtaining and comparing a previous initial transmembrane pressure difference measured immediately after the second cleaning step performed previously and most recently, and a current initial transmembrane pressure difference measured immediately after the second cleaning step performed this time; and determining if a quotient obtained by dividing the current initial transmembrane pressure difference by the previous initial transmembrane pressure difference exceeds a predetermined ratio;

performing a third cleaning step for cleaning the filtration membrane using a third chemical solution different from the first and second chemical solutions, if the quotient obtained in the determining step exceeds the predetermined ratio, followed by returning to the filtration operation; and returning to the filtration operation without performing the third cleaning step, if the quotient obtained in the determining step does not exceed the predetermined ratio.

2. The method for cleaning the filtration membrane according to claim 1, wherein the second cleaning step includes changing the concentration of the second chemical solution and/or the cleaning time of the second cleaning step in accordance with a temperature of the liquid to be treated.

3. The method for cleaning the filtration membrane according to claim 2, wherein in performing the second cleaning step, the concentration of the second chemical solution is decreased as the temperature of the liquid to be treated increases, and the concentration of the second chemical solution is increased as the temperature of the liquid to be treated decreases.

4. The method for cleaning the filtration membrane according to claim 2, wherein in performing the second cleaning step, the cleaning time is decreased as the temperature of the liquid to be treated increases, and the cleaning time is increased as the temperature of the liquid to be treated decreases.

5. The method for cleaning the filtration membrane according to claim 1, wherein the first chemical solution and the second chemical solution remove organic substance adhered to the filtration membrane.

6. The method for cleaning the filtration membrane according to claim 1, wherein in performing the third cleaning step, a concentration of the third chemical solution is decreased as a temperature of the liquid to be treated increases, and the concentration of the third chemical solution is increased as the temperature of the liquid to be treated decreases.

7. The method for cleaning the filtration membrane according to claim 1, wherein in performing the third cleaning step, a cleaning time is decreased as temperature of the liquid to be treated increases, and the cleaning time is increased as the temperature of the liquid to be treated decreases.

8. The method for cleaning the filtration membrane according to claim 1, wherein the third chemical solution removes inorganic substance adhered to the filtration membrane.

9. A method for cleaning a filtration membrane provided in a membrane filtration device which is immersed in a liquid to be treated and performs solid-liquid separation of the liquid to be treated, the method comprising:

monitoring a permeability of the filtration membrane while performing a filtration operation by the membrane filtration device;

performing, repeatedly, a first cleaning step for cleaning the filtration membrane using a first chemical solution, if a current permeability of the filtration membrane is lower than a first predetermined permeability, followed by returning to the filtration operation;

performing, repeatedly, a second cleaning step for cleaning the filtration membrane using a second chemical solution having a concentration higher than that of the first chemical solution and/or for a cleaning time longer than that of the first cleaning step, instead of performing the first cleaning step, if an initial permeability of the filtration membrane measured immediately after the first cleaning step most recently performed is lower than a second permeability which is higher than the first predetermined permeability, and if the current permeability is lower than the first predetermined permeability, followed by returning to the filtration operation; followed by resuming the filtration operation;

performing a determination step including:
obtaining and comparing a previous initial permeability measured immediately after the second cleaning step performed previously and most recently, and a current initial permeability measured immediately after the second cleaning step performed this time; and determining if a quotient obtained by dividing the current initial permeability by the previous initial permeability is lower than a predetermined ratio;

performing a third cleaning step for cleaning the filtration membrane using a third chemical solution different from the first and second chemical solutions, if the quotient obtained in the determination step is lower than the predetermined ratio, followed by returning to the filtration operation; and returning to the filtration operation without performing the third cleaning step, if the quotient obtained in the determination step is not lower than the predetermined ratio.

10. The method for cleaning the filtration membrane according to claim 9, wherein the second cleaning step includes changing the concentration of the second chemical solution and/or the cleaning time of the second cleaning step in accordance with a temperature of the liquid to be treated.

11. The method for cleaning the filtration membrane according to claim 10, wherein in performing the second cleaning step, the concentration of the second chemical solution is decreased as the temperature of the liquid to be treated increases, and the concentration of the second chemical solution is increased as the temperature of the liquid to be treated decreases.

12. The method for cleaning the filtration membrane according to claim 10, wherein in performing the second cleaning step, the cleaning time is decreased as the temperature of the liquid to be treated increases, and the cleaning time is increased as the temperature of the liquid to be treated decreases.

13. The method for cleaning the filtration membrane according to claim 9, wherein the first chemical solution and the second chemical solution remove organic substance adhered to the filtration membrane.

14. The method for cleaning the filtration membrane according to claim 9, wherein in performing the third cleaning step, a concentration of the third chemical solution is decreased as a temperature of the liquid to be treated increases, and the concentration of the third chemical solution is increased as the temperature of the liquid to be treated decreases.

15. The method for cleaning the filtration membrane according to claim 9, wherein in performing the third cleaning step, a cleaning time is decreased as a temperature of the liquid to be treated increases, and the cleaning time is increased as the temperature of the liquid to be treated decreases.

16. The method for cleaning the filtration membrane according to claim 9, wherein the third chemical solution removes inorganic substance adhered to the filtration membrane.

* * * * *